US006841005B2

(12) United States Patent　(10) Patent No.: US 6,841,005 B2
Schutte　(45) Date of Patent: Jan. 11, 2005

(54) APPARATUS AND METHOD FOR THERMAL SPRAYING

(75) Inventor: Karsten Schutte, Amberg (DE)

(73) Assignee: Flumesys GmbH Fluidmess-und Systemtechnik, Sulzbach-Rosenberg (DE)

(*) Notice: Subject to any disclaimer, the term of this patent is extended or adjusted under 35 U.S.C. 154(b) by 0 days.

(21) Appl. No.: 10/356,278

(22) Filed: Jan. 31, 2003

(65) Prior Publication Data

US 2003/0143318 A1 Jul. 31, 2003

(30) Foreign Application Priority Data

Jan. 31, 2002 (DE) .......................................... 102 03 884

(51) Int. Cl.[7] .............................................. B05C 11/10
(52) U.S. Cl. ........................ 118/665; 118/695; 118/708; 118/712; 118/47
(58) Field of Search .......................... 118/47, 712, 713, 118/714, 708, 688, 665, 695; 427/8

(56) References Cited

U.S. PATENT DOCUMENTS 6,485,689 B1 * 11/2002 Huang et al. .................. 422/83

2002/0142493 A1 * 10/2002 Halliyal et al. ............... 438/14

* cited by examiner

Primary Examiner—Mark A. Osele
Assistant Examiner—George R. Koch, III
(74) Attorney, Agent, or Firm—McDonnell Boehnen Hulbert & Berghoff LLP (57) ABSTRACT

The invention relates to an apparatus and a method for producing a sprayed layer on the surface of a substrate, wherein an admixture material which may have started to melt or is molten, is guided onto the surface of the substrate to be coated using a gas or gas mixture, as well as a relevant installation for producing the sprayed layer by means of a thermal spraying method, wherein the installation comprises means for supplying the admixture material or the gas or gas mixture. According to the invention, at least one feature of the thermal spraying process which influences the quality of the sprayed layer and which is responsible for the formation of the layer and its properties, is recorded, evaluated and assessed, checked, monitored and/or regulated. Both analogue and digital spectroscopic arrangements can be used as optical emission spectroscopic arrangements. The recording, evaluation and assessment, checking and/or monitoring using the optical emission spectroscopic arrangement can advantageously be used for online regulation and if necessary, also for optimising one or a plurality of parameters responsible for the formation of the layer and its properties.

10 Claims, 6 Drawing Sheets

Prior Art

APPARATUS AND METHOD FOR THERMAL SPRAYING

The present invention relates to a spraying apparatus for producing a coating on a surface according to the preamble of claim 1 and a method for thermal spraying according to claim 7.

Thermal spraying belongs to the group of forming and coating methods in accordance with DIN 8580. Also included here in accordance with EN 657 are those methods in which spraying admixtures begin to be melted, are melted on or melted away inside or outside spraying equipment and spin-on deposited on surfaces of workpieces. The surfaces are not melted on this occasion. Important advantages of the thermal spraying method are that almost any material can be coated and sprayed, that the material (substrate) to be coated is not thermally modified, that any size of component and geometry can be coated, that the methods can easily be automated and are flexible, and that by means of a suitable combination of material properties of the spraying admixtures, a sprayed layer tailored to the particular demand profile can be produced.

Various spraying methods are summarised under the term "thermal spraying". According to EN 657, these are classified according to the type of spraying admixture material, the production or the energy carrier. All thermal spraying methods use two types of energy, thermal and kinetic energy, to produce sprayed layers. These energy carriers are either a fuel gas-oxygen flame, an electric arc, a plasma jet or a laser beam. The thermal energy is required to begin to melt or melt on the spraying admixture. The kinetic energy coupled with the particle speed serves to influence the layer thickness, the inherent tensile adhesive strength of the sprayed layer, and the tensile adhesive strength of the layer with respect to the base material. The kinetic energy varies very substantially, depending on the method of thermal spraying used and is also dependent on the spraying material and the particle size of the spraying admixture.

Known variants of thermal spraying in accordance with EN 657 are the flame spraying method (wire or rod flame spraying, powder flame spraying, plastic flame spraying, high-speed flame spraying, detonation spraying (flame shock spraying)), plasma spraying, arc spraying and laser spraying. As special methods mention may also be made of the so-cold cold gas spraying which is described in detail in DE 197 47 386 A1 and EP 0484 533 B1.

The areas of usage and applications of thermal spraying are very varied and range from decorative coatings for household and kitchen appliances through emergency/wear protective layers in automobile engineering to high-temperature protective layers in aviation and space engineering. Specially advantageous embodiments and admixture systems have also been developed for special cases of application and areas of usage.

Figure 6:
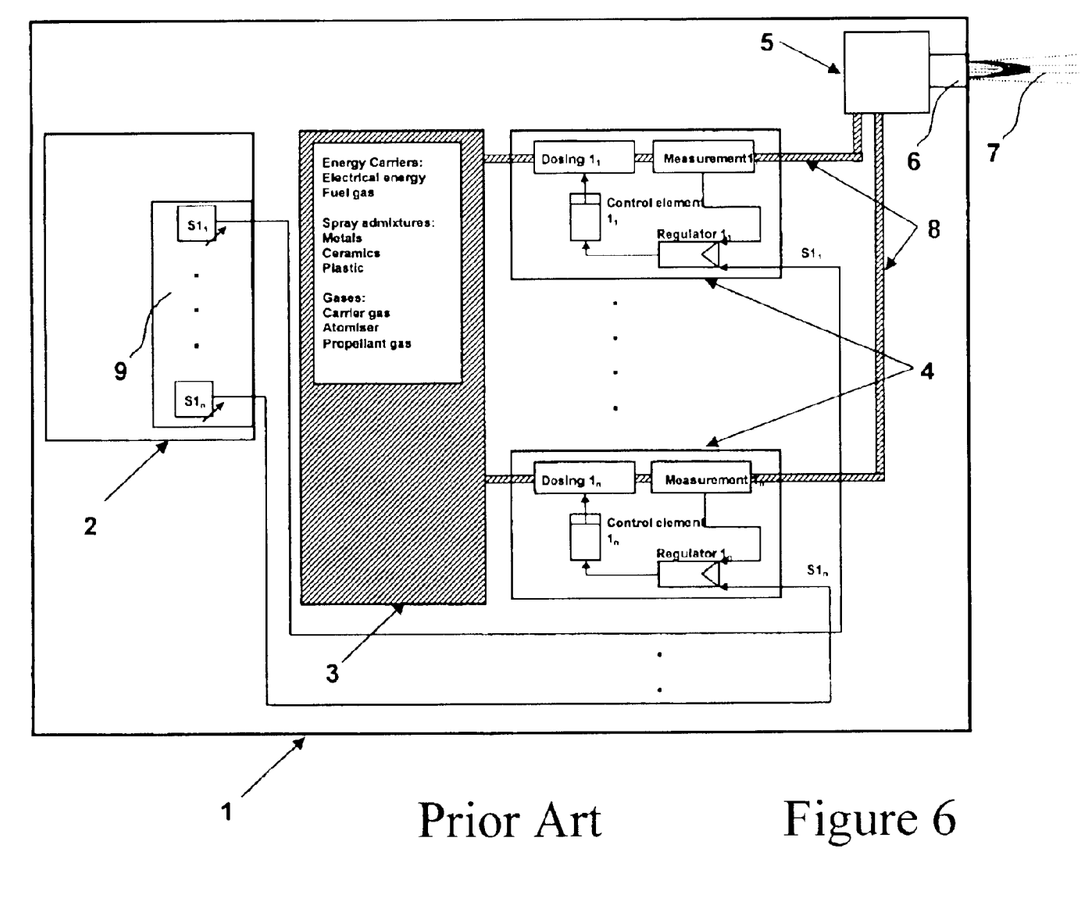
FIG. 6 is a schematic representation of a spraying installation in accordance with EN 1395 with internal regulation of the parameter n and set-value presetting $S1_n$.

In view of the plurality of thermal spraying methods and the need to ensure uniform quality of the sprayed layers produced, EN 1359 describes and regulates relevant standard conditions for quality assurance and for acceptance/testing of spraying installations. FIG. 6 shows a thermal spraying installation 1 in accordance with EN 1395. In the spraying installation control system 2 one or several set values for the parameters to be monitored are typically preset with the aid of an internal presetting module 9. The set values made available by the presetting module 9 are denoted in the following as $S1_1, S1_2, \ldots S1_n$ where $n=1,2,\ldots$ gives the number of parameters to be monitored. In general, an attempt is made to keep the spraying parameters constant in the long term within a tolerance range of approx. ±5% of the preset set value. The energy carriers (for example, electrical energy and/or fuel gases), spraying admixtures (for example, metals, ceramics or plastics) and gases (for example, carrier gas, atomiser gas and/or propellant gas) are supplied from the store 3 via suitable supply lines 8 and regulating units 4 of the spray gun 5. The set values made available to the regulating units 4 from the presetting module 9 allow the tolerances described in EN 1395 to be monitored for the individual spraying parameters. The spray jet 7 emerges from the spray nozzle 6 built into the spray gun 5 and is available for coating the component. The acceptance tests for spraying installations regulated in EN 1359 are only the obligatory minimum requirements for the spraying installation itself. However, the aim of a technically and economically optimised spraying process (spraying method and spraying apparatus) must be to provide, as well as layer quality, the highest possible reproducibility with the lowest wastage and material usage with simultaneously increased performance/production capacity of the spraying installation.

So far the parameters having an influence in thermal spraying have been recorded, checked and/or monitored in accordance with the tolerance limits preset in EN 1359. This should ensure the reproducibility and quality of the layers. In this case, selected, relevant process parameters are measured, regulated and if necessary, also documented. Relevant process parameters are, for example, the gas flows (carrier gas and/or fuel gas as necessary), current intensities, spraying distance, spraying angle (angle between spray jet and substrate surface), the relative speed of the spray jet to the substrate surface, the incorporation of admixture material, the quantity of spray powder or the wire displacement speeds etc. The following table gives an example of the main parameters having an influence on plasma spraying and illustrates the many-sided nature and the resulting deficiencies of industrially suitable reproducible regulation with tolerance values in accordance with EN 1395.

TABLE 1

Main parameters having an influence in plasma spraying.

Spraying conditions

Spraying distance
Relative speed of plasma gun
Ambient medium
Substrate cooling
Powder supply Type and flow rate of feed gas
Feed rate of powder
Site of powder injection
Powder injection rate
Energy carrier Voltage
Current intensity
Flow rate of plasma gas
Electrode shape of plasma gun
Spray powder Powder size
Powder form
Particle size distribution
Physical properties
Chemical properties
Substrate properties Substrate temperature
Surface roughness TABLE 1-continued Main parameters having an influence in plasma spraying.

Physical properties
Chemical properties

DE 198 20 195 A1 discloses a method for producing a sprayed layer on the surface of a substrate wherein an admixture material which has started to melt or is melted as appropriate is guided onto the surface of a substrate to be coated using a gas or gas mixture. Also described is a relevant installation for producing the sprayed layer by means of a thermal spraying method wherein the installation comprises means for supplying the admixture material and the gas or gas mixture. In accordance with DE 198 20 195 A1 at least one feature of the thermal spraying process which influences the quality of the sprayed layer is recorded, checked and/or monitored by means of a digital camera. Both digital image cameras and digital video cameras can be used as the digital camera. The method described in DE 198 20 195 A1 is a so-called Particle Flux Imaging (PFI) method. This allows in-situ diagnostics of plasma spraying processes based on a digital high-speed camera. In this case, a random separation of the particle and gas fraction takes place in the spray jet followed by digital image processing. As a result of the high expenditure required for adjustment and the movable mechanical components, this method is not suited to industrial applications.

Also known from the prior art are methods for spectral emission analyses which permit the temperature of the particles and the gases to be determined. In this case, the temperature must be sufficiently high to at least form emitting neutral particles. Since regions with local thermal equilibrium and regions of nonequilibrium occur in the flame, primarily edge regions can lead to errors as a result of higher temperature gradients. The necessary de-abelianisation of the recorded spectral line intensities as a result of lateral observation of the flame limits the method. The spectral intensity derived from time-averaged measurements cannot be converted directly into a temperature value because the relationships are not linear. In addition, measuring equipment with high investment costs and unjustifiable expenditure on adjustment, maintenance and apparatus for industrial application are required for quantitative recording of the temperature. However, the time-resolved recording of characteristic spectral line intensities can be used at least to make qualitative predictions on the progress of thermal spraying processes. In addition, qualitative relationships between the recorded spectral line intensities and systematically modified parameters can be presented. This method is described in detail in Practical experience in the use of a spectrometer measuring system for process monitoring and optimisation in thermal spraying, Aumüller, B, Lang, A., Dotzler, K. and Schutte, K., Proceedings of the UTSC 1999, Düsseldorf, DVS reports (1999), p. 747–749, whose content should be taken into this application by reference. This method is merely suitable for process analysis and/or monitoring. Online process control of the thermal spraying process is not possible.

The object of the present invention is thus to provide an improved method and an improved apparatus where, in addition to high layer quality, high reproducibility is achieved with low wastage and material usage. In this case, it should be possible to control the quality of the sprayed layers produced during the continuous spraying process. Moreover, monitoring of changes in the energy carrier supply and the supply of spraying admixture materials should at least be ensured. The solution according to the invention should respond reliably to significant changes in the particle properties and should be usable in a rough industrial environment.

This object is achieved according to the invention by a spraying apparatus having the features of claim 1 and a method for thermal spraying having the features of claim 7. Advantageous embodiments and further developments of the invention are described in the dependent claims.

The disadvantages of the prior art are overcome by the present invention. In particular, an improved method and an improved apparatus are provided where, in addition to high layer quality, high reproducibility is achieved with low wastage and material usage. In this case, it is possible to control the quality of the sprayed layers produced during the continuous spraying process. Moreover, it is possible to monitor changes in the energy carrier supply and the supply of spraying admixture materials. The solution according to the invention can respond reliably to significant changes in the particle properties and can be used in a rough industrial environment.

The object according to the invention is solved in terms of method by recording, checking, and monitoring at least one feature of the spraying process which influences the quality of the sprayed layer by means of an optical spectroscopic arrangement and/or regulating the spraying process online. In the spraying apparatus there is accordingly provided an optical spectroscopic arrangement for recording, checking, monitoring and/or regulating at least one feature of the thermal spraying process which influences the quality of the sprayed layer.

Features of the spraying process which influence the quality of the sprayed layer are known to the person skilled in the art and/or users of thermal spraying methods. These can either be parameters of the spraying process itself and/or quantities corresponding to one or several parameters and/or derived therefrom and/or relative ratios of these. For example, these are:
  the incorporation of spray admixture into the fuel gas-oxygen flame during flame spraying or into the plasma during plasma spraying,
  the characteristics of the spray jet (intensity distribution, total intensity, geometric shape, size etc.).

The diagnostics configured according to the invention for recording, checking, monitoring and/or regulating the features of the thermal spraying process which influence the quality of the sprayed layer lead to a simple but extremely efficient and flexible quality assurance for thermal spraying from the point of view of apparatus and technical and economic expenditure.

For example, in industrial operations and research equipment using thermal spraying, where different spraying methods are used simultaneously and with frequently changing spraying applications and/or using different spraying admixtures, the reproducibility and quality of the sprayed layers can be ensured very quickly, efficiently and on a long-term basis by evaluating features affecting quality or parameters and/or quantities of the spraying process and/or the relative ratios of these using one or several recorded standards (for example, the set value of the total intensity integral and/or set values of the characteristic energy carrier and/or spraying admixture line intensities) using the spraying apparatus configured according to the invention. By this means all the sprayed layers produced have a uniform and defined quality.

Furthermore, even after a fairly long time, when installation and machine parameters specified by the user are re-used, sprayed layers of comparable quality can be reproducibly produced by comparing the recorded standards. In addition to the long-term quality assurance of the thermally sprayed layers by evaluating features affecting quality or parameters and/or quantities of the spraying process and/or the relative ratios of these using the diagnostics configured according to the invention, specific online regulation of the spraying process is also ensured whereby fluctuations of the influencing parameters (for example, the powder feed rate) occurring for a short time during the process can be eliminated by time-resolved recording of specified standard features (for example, set values of the characteristic energy carrier and/or spraying admixture line intensities) during the spraying process, which in turn results in high reproducibility and uniform quality of coatings of several components of the same type repeated at short intervals on the one hand and/or coatings of larger components undertaken over a longer time on the other hand.

Here it is extraordinarily important that any undesirable impairment and/or interaction of the diagnostics configured according to the invention with the thermal spraying process or the sprayed layer produced as a result of the recording, checking and/or monitoring of the quality features is completely eliminated because of the non-destructive and non-contact optical recording.

Both digital and analogue spectroscopic arrangements can be used as optical spectroscopic arrangements. For the functionality it is irrelevant whether the spectroscopic arrangement to be used, generally consisting of at least the spectral apparatus for spectral decomposition of the emission, a converter for producing an analogue electrical signal proportional to the spectral intensity and a converter for generating an again proportional digital signal, is spatially separated as individual assemblies or is fully integrated for example as a PC plug-in card spectrometer with a built-in analogue-to-digital converter. On the one hand, spatially resolved measurements as well as time-resolved measurements of the spectral line intensity and/or total intensity integrals can ensure the required recording, checking, monitoring and/or regulation. At the present time, a minimum time window of one millisecond is to be seen, for example, as a normal technical and economic lower limit for time-resolved recording of the parameters because as a result of the internal, automated spray installation control systems currently used and their operating and program cycles, faster conversion of the control signals cannot be used.

The recording, checking, monitoring and/or regulation can advantageously be used with the spectroscopic arrangement for regulating and if necessary, optimising one or several parameters. The digital technique enables the recordings used to record, check, monitor and/or regulate the quality of the sprayed layer to be made visible and/or to be evaluated without any problems directly in the continuous spraying process and an optimising regulation of the spraying parameters can thus take place online. The optimisation of the parameters contributes on the one hand to the economic efficiency of the thermal spraying process since any inefficiently high consumption of one or a plurality of substances (for example, gases, spray admixtures, energy carriers etc.) required in the thermal spraying method is avoided. On the other hand, increased working and process safety is ensured since the incorporation of impurities (for example, impurities in the spray admixture) or the use of substances not meeting the quality requirements (for example, gases of insufficient quality) can be identified early and quickly at the beginning and during the spraying process.

The possible plurality of evaluation and presentation possibilities offered by the digital techniques can be utilised within the framework of the invention. Depending on the individual case, for example, computer-processed raw data on the recorded spectra can bring about certain advantages. For this purpose, under certain circumstances mathematical evaluation algorithms such as, for example, construction of the integral, construction of the differential and/or construction of the ratio of one or a plurality of recorded line intensities and/or construction of the ratio of one or a plurality of total intensity integrals can be used. By using digital techniques, it is also possible to select different representation variants matched to the particular application, for example, computer alienated or processed. The representation can basically take place as a time sequence of one or a plurality of parameters relevant to the spraying process or derived quantities. In addition to the normal time-resolved representation, for example, contour representations, polar coordinate representations and/or representations as amplitude or frequency spectra after applying Fourier transformation or mixed forms thereof can also be used.

In a further development of the invention, data and recordings prepared using the optical spectroscopic arrangement can also be used to document one or a plurality of features influencing the quality of the sprayed layer and/or the spraying process itself. Advantageous further developments of the invention include all possibilities made available by the analogue and digital technique by suitable electrical, data-technical and optical connections as well as interfaces, to produce direct and online communication and data exchange between the invention and external equipment/systems. It is advantageous here if the recording and archiving of the relevant features can take place online in an internal permanent data memory or also in an external data management system. A further advantageous development consists in the fact that limiting value messages can be produced in a simple fashion in analogue or digital form from the features determined and can be transferred directly to the spray installation control system for further processing during the spraying process. By means of a suitable further development of the invention it is also ensured that by using one or a plurality of recording channels and spectroscopic arrangements, time and/or spatially resolved recording of different spray jet regions and/or a plurality of spray jets from different spraying installations can be accomplished simultaneously. The invention which preferably records and spectrally decomposes the emissions occurring in the spray jet in the visible range (preferably 350 nm–850 nm) can advantageously be further developed in a simple fashion according to the particular application so that spectral intensities can be recorded in the ultraviolet spectral range (preferably 200 nm–350 nm) and/or in the infrared spectral range (preferably 850 nm–8 $\mu$m) to record, check, monitor and/or regulate the spray parameters. In another advantageous embodiment the invention can be implemented without limiting the functionality as a free-standing PC, a portable compact device or as a 19" rack module for existing installations and systems.

An advantageous embodiment of the invention is described as an example in the following with reference to the appended drawings. The same or similar parts in the drawings are designated by the same reference symbols, wherein.

Figure 1:
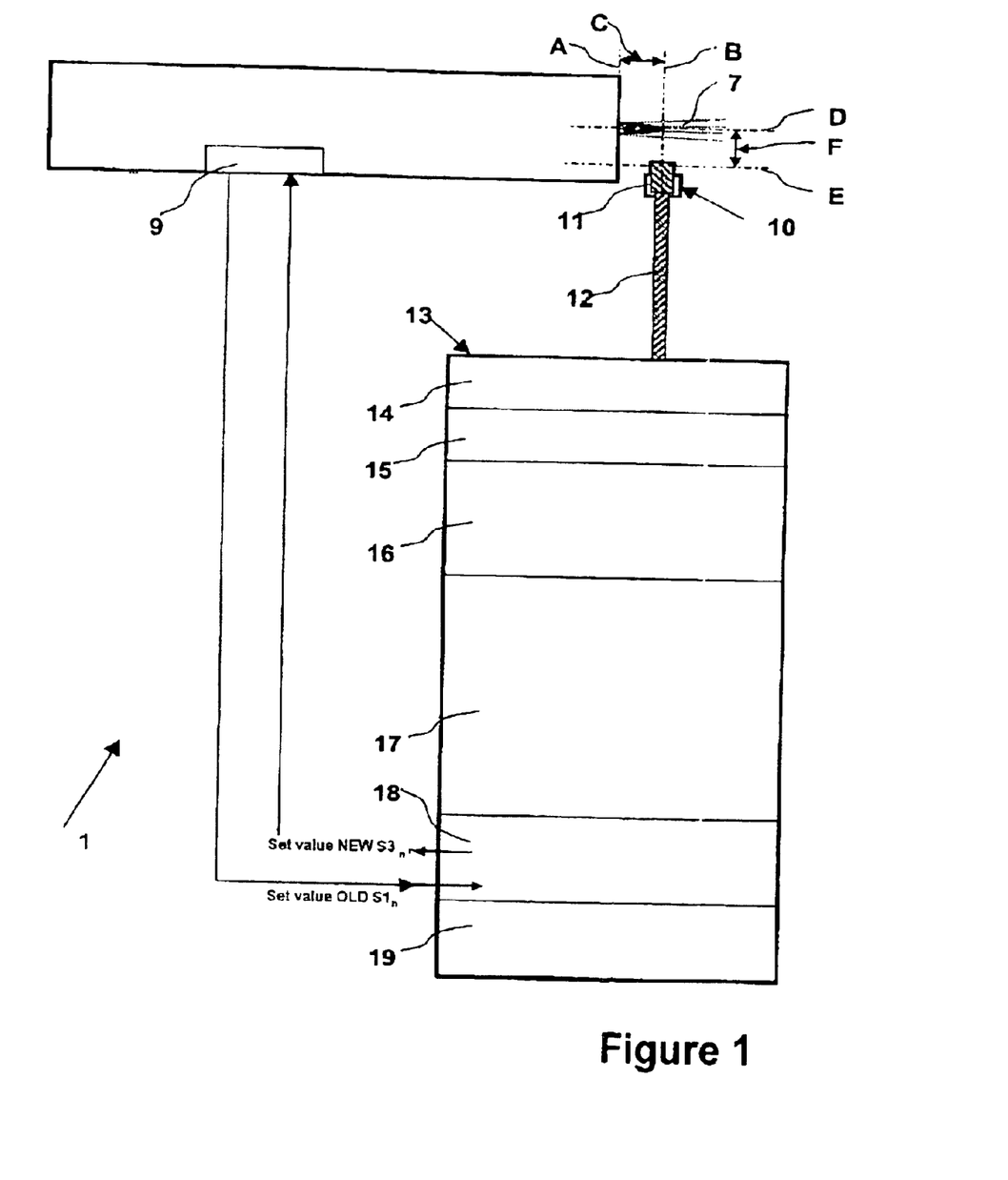
FIG. 1 is a schematic view of an embodiment of a regulated spraying installation with built-in spectroscopic arrangement.

FIG. 1 shows an advantageous embodiment of a regulated spraying apparatus 1. The spraying apparatus 1 has devices for recording, monitoring, checking and regulating using an optical spectroscopic arrangement 13. Here it is ensured that the spray parameters which lie within a tolerance range of better than ±1% of the preset set value are kept constant in the short term and also in the long term. The spray jet emerges from the spray nozzle, not shown, of the spraying apparatus 1 and the spectrum emitted by the spray jet 7 is recorded via an optical sensor 10 which has suitable collimation optics 11 with built-in protective gas flushing. The optical sensor 10 is positioned at a lateral distance C with reference to the outlet plane A of the spray jet and the plane E parallel hereto which is defined by the tip of the gas fraction of the spray jet 7. A distance C of 10 mm–100 mm is typically to be selected here. The vertical or radial position of the optical sensor 10 is to be selected at the distance F with reference to the centre line D of the emerging spray jet 7 and the upper edge E of the optical sensor 7. The distance F is typically 20 mm–200 mm. With such a selected position of the optical sensor 10 it is possible to record the emission of the gas fraction and also the emission of the particle fraction in the spray jet 7. The emission of the spray jet 7 is focussed by the collimation optics 11 built into the optical sensor 10 into a glass-fibre cable 12. The glass-fibre cable 12 then transmits the emission to the optical spectroscopic arrangement 13, wherein the interface for the transmission is a spectrometer module 14 built into the spectroscopic arrangement 13. As further component the spectroscopic arrangement 13 contains the following components: an ADC module 15, a measured value recording and evaluation module 16, a regulating and adjusting module 17, an interface module 18 and a database module 19. The set values for the spray parameters prepared by the set-value presetting module 9 built into the spray installation control system 2 are fed in via the interface module 18 built into the spectroscopic arrangement 13. Depending on the result and decision of the regulating and adjusting module 17, either the set values $S1_1, S1_2, \ldots S1_n$ (where n=1,2, ... is the parameter index) are returned or the set values $S2_1, S2_2, \ldots S2_n$ (where n=1,2, ... is the parameter index) newly formed in the regulating and adjusting module 17 of the spectroscopic arrangement 13 are transferred as new set values $S3_1, S3_2, \ldots S3_n$ (where n=1,2, ... is the parameter index) to the spraying installation 1 via the interface module 18 of the spectroscopic arrangement 13. In this embodiment transfer of the set values to the set value presetting module 9 built into the spray installation control system, 2 is provided. Naturally, the set values can also be transferred from the interface module 18 directly to the regulating units 4 of the spraying installation 1. In both case, efficient online changing and regulation of the spray parameters and efficient quality assurance of the sprayed layer is ensured.

Figure 2:
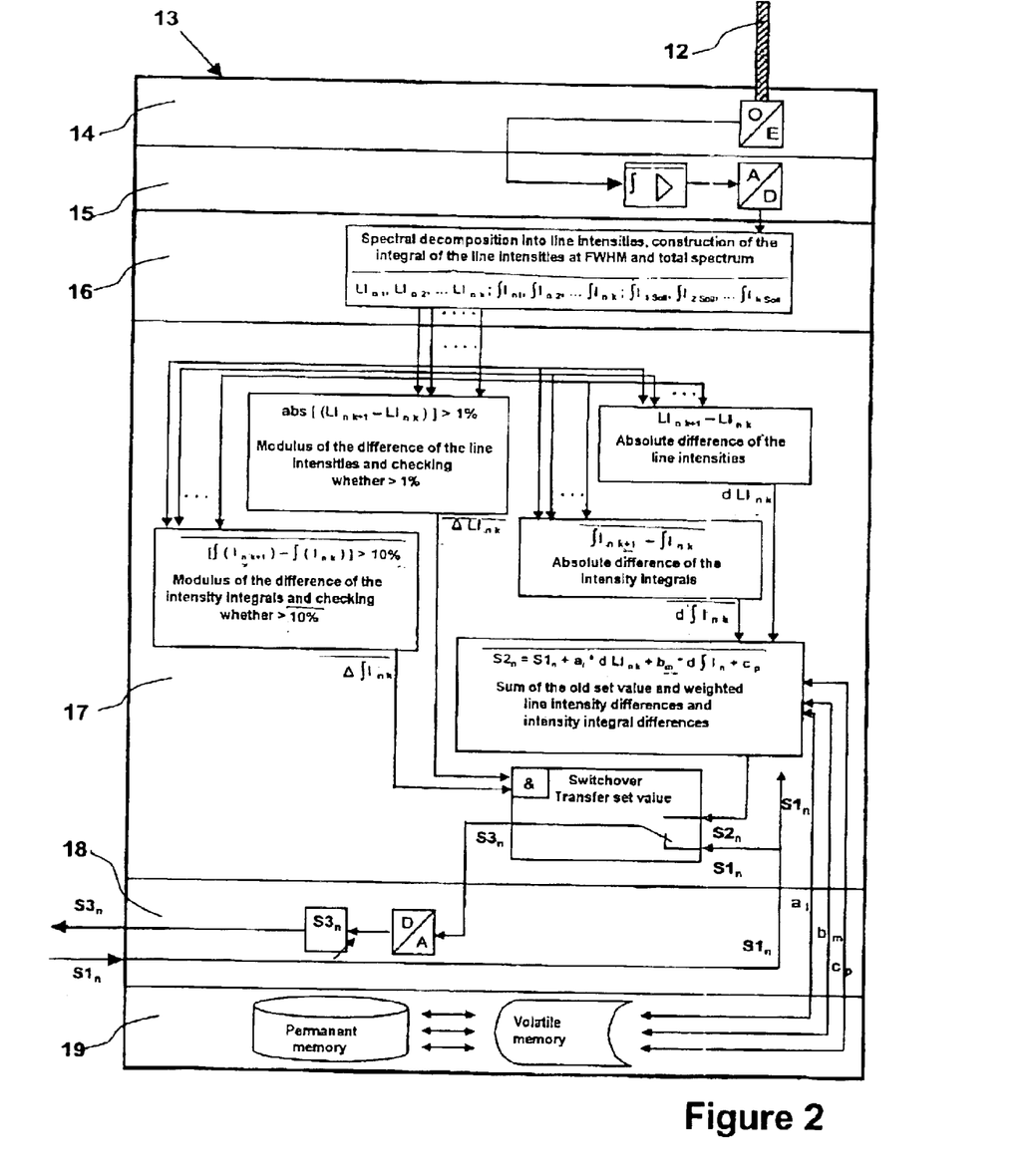
FIG. 2 is a schematic flow chart for the recording, checking, monitoring and/or regulation of the spray parameters in the spectroscopic arrangement from FIG. 2.

FIG. 2 describes the sequence for the recording, checking, monitoring and regulation of the spray parameters within the spectroscopic arrangement 13 shown schematically in FIG. 1. The emission of the spray jet 7 is fed directly via the optical sensor 10 and the glass-fibre cable 12 into the spectrometer of the spectrometer module 14. In the spectrometer module 14 the optical signal is converted into a proportional electrical signal. This signal enters the ADC module 15 which amplifies and converts the analogue signal into a proportional digital signal and is thus available for digital signal processing in the measured value recording and evaluation module 16.

In the measured value recording and evaluation module 16 the recorded emission spectra are time-resolved and the four line intensities characteristic of the process sequence in the present embodiment are determined (preferably two gas and two powder lines), and the relevant integral line intensities and the total integral of the spectrum are calculated. The individual intensities of the lines are denoted in the following by $LI_{n1}, LI_{n2}, \ldots, LI_{nk}$ (where n=1,2, ... is the parameter index and k=1,2, ... is the time index). The relevant integrals of the lines are determined from the numerical integral of the line intensity based on the full width at half-maximum of the given line and are characterised in the following by integrals of the spectra $\int I_{n1}, \int I_{n2}, \ldots, \int I_{nk}$ (where n=1,2, ... is the parameter index and k=1,2, ... is the time index). The notation $\int I_1, \int I_2, \ldots, \int I_k$ (where k=1,2, ... is the time index) is used accordingly for the integrals of the total spectrum. In the event of successful commissioning and acceptance of the spraying installation in accordance with EN 1397, a reference parameter data set $[(LI_{1\ set}, LI_{2\ set}, \ldots, LI_n\ set); (\int I_{1\ set}, \int I_{2\ set}, \ldots, \int I_{n\ set}); (\int I_{set})]$ is set out for the respective use in the database module 19 of the spectroscopic arrangement. In addition, during operation of the spraying installation 1 when a new component to be coated is supplied, the integral of the total spectrum $\int I_{n\ act}$ is archived accordingly. By means of successive comparison and tracking of the change in the actual value $\int I_n$ with the value $\int I_{set}$, the long-term state of the spraying installation 1, for example, the nozzle wear by the arc in plasma spraying, can be monitored and regulated. In addition to long-term monitoring and regulation, the elimination of short-term deviations of the spray parameters is also strived for.

The fundamental procedure for short-term decision making as to whether the set value $S1_n$ provided by the set value presetting module 9 of the spray installation control system 2 should be returned or a re-determined set value $S2_n$ must be transferred to the spray installation control system 2 is described in the following. For this purpose the absolute differences of the line intensities ($dLI_{nk}$) and the absolute differences of the line intensity integrals ($d\int I_{nk}$) are constructed in a time interval of less than 1 second. The following calculation of the time-dependent internal set values $S2_n$ is made with the aid of the line intensity differences $d\int I_{nk}$, the line integral differences $d\int I_{nk}$ and the correction terms $a_1, b_m, c_p$ provided by the database module 19 using the mathematical formula $S2_n = S1_n + a_1 * dLI_{nk} + b_m * d\int I_{nk} + c_p$. The correction terms were first determined empirically and are available to the system by a single transmission from the permanent to the volatile memory of the database module 19.

At the same time as determining the differences $dLI_{nk}$ and $d\int I_{nk}$ described above, the moduli of the differences are constructed from the time-variable line intensities ($\Delta LI_{nk}$=abs[$LI_{nk+1}$−$LI_{nk}$]). A check is then made to determine whether these moduli $\Delta LI_{nk}$ differ by more than 1% relative to the respective previous value. If a corresponding deviation occurs, a suitably assigned Boolean variable $dLI_{nk}$ is set to 1. Otherwise this has the value 0. At the same time the moduli of the differences are calculated from the time-variable intensity integrals ($d\int I_{nk}$=abs[$\int I_{k+1}$−$\int I_k$]). A check is then made to determine whether these amounts $d\int I_{nk}$ differ by more than 10% relative to the respective previous value. If a corresponding deviation occurs, a suitably assigned Boolean variable $\Delta\int I_{nk}$ is set to 1. Otherwise this has the value 0.

This is then followed by an "AND" operation on the two Boolean variables $\Delta\int I_{nk}$ and $\Delta LI_{nk}$ time-resolved in a further logic operation. If the result is a logical "1" (=true), the internally re-calculated set value $S2_n$ is transferred to the interface module 18 as the new set value $S3_n$. If the result is a logical "0" (=false), the old set value $S1_n$ made available by the presetting module 9 of the spray installation control system 7 is transferred to the interface module 18. From the interface module 18 the set value $S3_n$ is finally transferred to the presetting module 9 of the spray installation control system 7 or directly to the regulating units 4 of the spraying installation 1.

Figure 3:
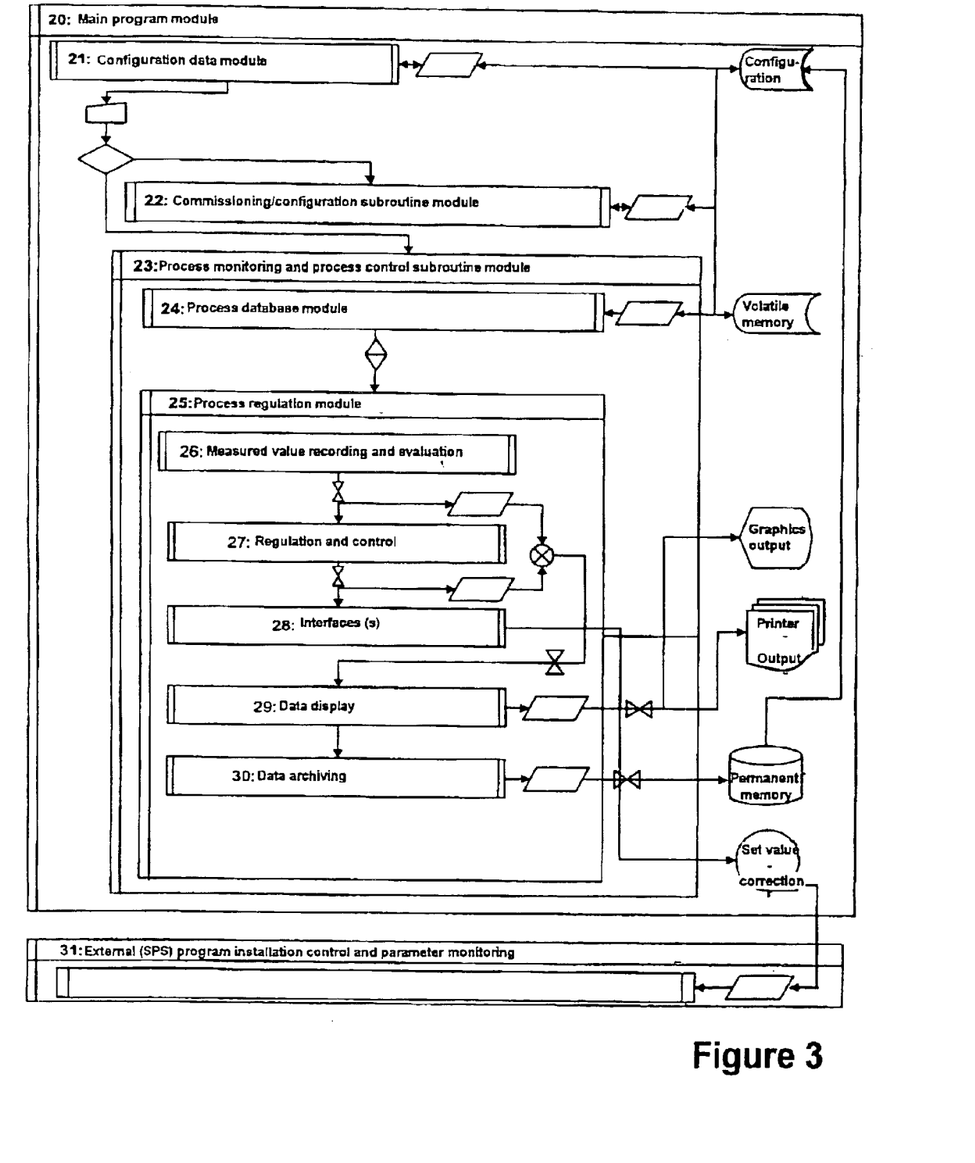
FIG. 3 is a schematic flow chart of the software for the spectroscopic arrangement in the apparatus from FIG. 2.

FIG. 3 reproduces the method described above for recording, evaluating and calculating the new set value $S3_n$ for regulating a spraying apparatus according to the invention in the form of a flow chart. The main program module 20 provides automated servicing of the functions and modules described above. Within the main program module 20 the configuration data is first loaded by the "load configuration data" module 21, which communicates to the system the basic configurations of the available hardware, into the volatile memory which is made available by the permanent memory in the database module 19. The following modules operate automatically but can be specifically interrupted however by a manual input from the user. This especially includes the "commissioning/configuration" subroutine module 22 which is used for reconfiguring, input/output testing and for acceptance of the spectroscopic arrangement 13. In the "process monitoring and process control" subroutine module 23 the "load process database" module 24 for automatic identification of various usage-specific spray admixtures and the "process regulation" module 25 for automated recording of measured values, processing of measured values, calculation of adjustment and regulating signals, data visualising and data archiving are implemented. Within the "process monitoring and process regulation" subroutine module 25 the "measured value recording and evaluation" function 26 takes over the time-resolved breakdown of the recorded emission spectra already described previously, the determination of four line intensities characteristic of the process sequence, and the calculation of the relevant integral line intensities and the total integral of the spectrum. The "regulation and control" function 27 takes over the numerical task already described involving the time-dependent calculation of the absolute differences of the line intensities and line intensity integrals and also the relevant percentage deviations from the preceding value in the register associated with the generation of the corresponding Boolean variable for deciding on the transfer of the corresponding set values. The internal new set value pre-settings are also calculated here and transferred to the "interface" function 28. This last function 28 ensures that the new set values are transferred to an analogue or digital interface for set value correction to an externally running (SPS) program 31 inside the spray installation control system 2 and that the time-resolved recorded and calculated data are transferred to the "data display" function 29 and the "data archiving" function 30. Additional input/output units allow this data to be output and high-quality recordings on the screen and/or printer.

Figure 4:
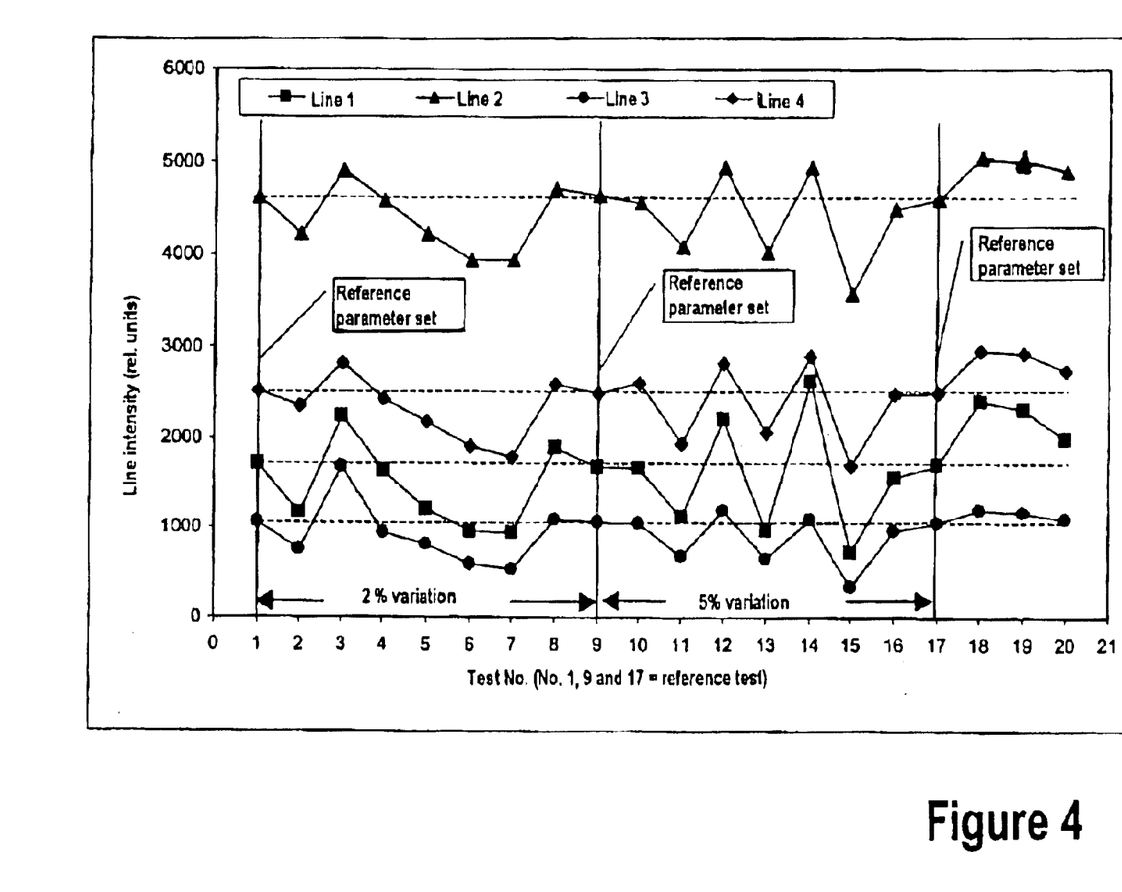
FIG. 4 Time behaviour of the spectral line intensities as a function of short-term fluctuations of the spray parameters during plasma spraying.

FIG. 4 shows the time intensity behaviour of four characteristic spectral lines (two each for the spray powder and two each for gases) as a function of short-term fluctuations of the spray parameters for plasma spraying of tungsten carbide-cobalt (WC/Co). The aim here is that by an optimised choice of current intensity, powder feed rate, quantities of plasma gas (argon, hydrogen) and positioning of the powder injector, the spray powder describes such a flight path in the hot gas jet that the spray powder is brought onto the component in a state where it has started to melt or is melted. However decomposition of the carbide (WC) by too high temperatures must be avoided. FIG. 4 illustrates the fast and efficient recording and regulation using the evaluation of the line intensities. The tests characterised by 1, 9 and 17 in FIG. 4 give the reproduction of the set-reference settings. In tests 2–8 there was a definite variation of the relevant parameters by ±2 with respect to the set value and in tests 10–16 there was a definite variation by ±5%. FIG. 4 illustrates in an impressive fashion that it is possible to reproducibly record especially short-term fluctuations of the relevant spray parameters, which are permitted in accordance with EN 1397, and regulate them online to the set parameters.

Figure 5:
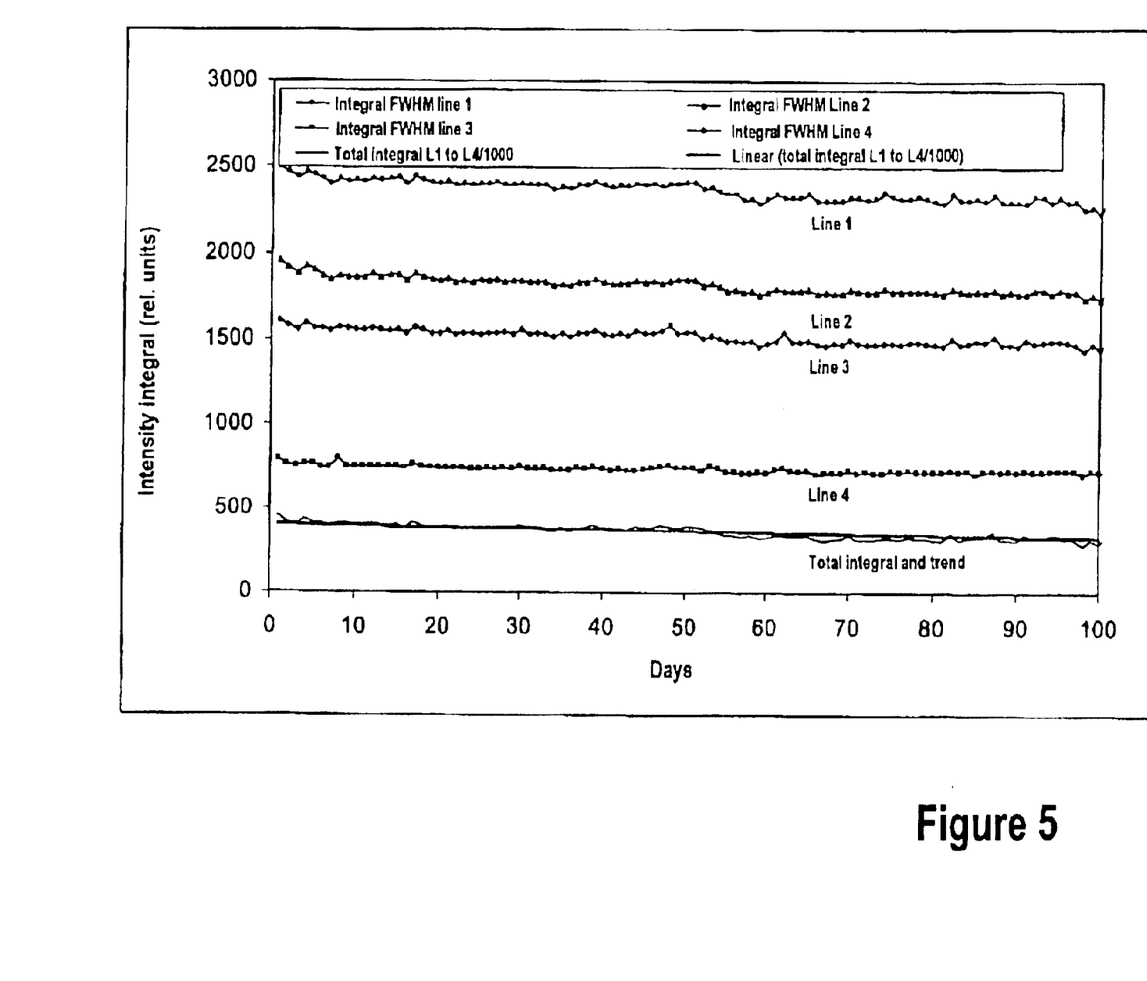
FIG. 5 Time behaviour of the intensity integrals of individual spectral lines and of the total intensity integral as a function of long-term wear phenomena in a plasma spraying installation.

FIG. 5 shows the long-term time behaviour of the intensity integrals of individual selected spectral lines, the integral of the total spectrum and the relevant linear trend line for plasma spraying of WC/Co. During plasma spraying it is especially important that any negative influence on the quality of the sprayed layer caused by wear of the spray nozzle is identified in good time. As a result of the high current intensities in the arc, burn-off phenomena and changes to the electrode spacing occur here. Spraying installations designed in accordance with EN 1397 only have limited possibilities for regulating the current to compensate for wear where however, no online prediction can be made on the quality of the sprayed layer. The aim however is that the complete lifetime of the nozzles and electrode inserts can be fully utilised with the quality of the sprayed layer being uniformly high and reproducible. The integral intensities of the characteristic spectral lines and the integral of the total spectrum especially yield quantitative predictions on the state of the spray nozzle and criteria for deciding on the time for changing the nozzles and electrodes. The integral values shown in FIG. 5 over a fairly long reference time make it clear that as a result of the long-term comparison of the recorded integrals and the corresponding regulation of several spray parameters independently of one another, on the one hand the maximum lifetime of the nozzle can be utilised and on the other hand, the end of the lifetime can be predicted with the quality of the sprayed layers produced remaining uniformly high. This also brings about a significant increase in the performance of the plasma spraying method and the performance of the plasma spraying installation.

| List of reference symbols | |
|---|---|
| 1 | Spraying installation |
| 2 | Spraying installation control system |

List of reference symbols

| | |
|---|---|
| 3 | Store for energy carriers, spray admixtures and gases |
| 4 | Regulating units 1 ... n with measurement and dosing of the parameter 1 ... n |
| 5 | Spray gun |
| 6 | Spray nozzle |
| 7 | Spray jet |
| 8 | Feed lines for energy carriers, spray admixtures and gases |
| 9 | Presetting module for presetting set values $S1_1$, $S1_2$, ... $S1_n$ for parameters 1, 2 ... n with n = 1, 2, ... (parameter index) |
| 10 | Sensor |
| 11 | Optical collimation unit |
| 12 | Glass-fibre cable |
| 13 | Spectroscopic arrangement |
| 14 | Spectrometer module |
| 15 | ADC module |
| 16 | Measured value recording and evaluation module |
| 17 | Regulating and adjusting module |
| 18 | Interface module |
| 19 | Database module |
| 20 | Main program |
| 21 | Configuration data module |
| 22 | Commissioning/configuration subroutine module |
| 23 | Process monitoring and process control subroutine module |
| 24 | Process database module |
| 25 | Process regulation module |
| 26 | Measured value recording and evaluation function |
| 27 | Regulation and control function |
| 28 | Interface function |
| 29 | Data display function |
| 30 | Data archiving function |
| 31 | External SPS (program) installation control/parameter monitoring |

What is claimed is:

1. A thermal spraying apparatus for producing a coating on a surface of a substrate, wherein the thermal spraying apparatus has an energy carrier store, devices for supplying coating material and for supplying gas, a control unit, a regulating unit, a spraying system with a spray nozzle for producing a spray jet, and an optical sensor device for recording at least one parameter which influences the quality of the coating, characterised in that there is provided a spectroscopic unit which is connected at its input to the optical sensor device and is connected at its output to the regulating unit, the spectroscopic unit having a spectral system for spectral analysis of the emission of the spray jet.

2. The spraying apparatus according to claim 1, characterised in that the spectroscopic unit is constructed as a digital unit.

3. The thermal spraying apparatus according to claim 1, characterised in that there is provided a converter for generating an analogue electrical signal proportional to the spectral intensity and a further converter for generating a digital signal proportional hereto.

4. The thermal spraying apparatus according to claim 3 characterised in that the regulating unit is provided to regulate the spraying process using an actual value-set value comparison based on the signals of the spectroscopic unit and stored set-value data for one or a plurality of parameters influencing the quality of the coating.

5. The spraying apparatus according to claim 4 characterised in that devices are provided to vary the spray parameters which are controllable by the regulating unit.

6. The thermal spraying apparatus according to claim 1, characterized in that a computer is provided to process the raw data using mathematical evaluation algorithms.

7. The thermal spraying apparatus according to claim 1, characterised in that a plurality of spray jets or spraying installations are provided, and a plurality of optical sensors, recording channels, and spectroscopic arrangements is provided to simultaneously record, with time and/or spatial resolution, parameters of the different spray jet regions and/or a plurality of spray jets from different spraying installations.

8. The thermal spraying apparatus according to claim 7, characterised in that the optical sensors, recording channels, and spectroscopic arrangements are adapted to record and spectrally analyze spray jet emissions in the visible range, preferably in the range between 350 nm to 850 nm.

9. The thermal spraying apparatus according to claim 7, characterised in that the optical sensors, recording channels, and spectroscopic arrangements are adapted to record and spectrally analyze spray jet emissions in the ultraviolet range, preferably in the range between 200 nm and 350 nm, or in the infrared spectral range, preferably in the range of 850 nm to 8 $\mu$m.

10. The thermal spraying apparatus according to claim 1, characterized in that the spectroscopic unit is constructed as an analogue unit.

* * * * *